United States Patent Office
3,101,335
Patented Aug. 20, 1963

3,101,335
DIUREIDOTRIAZINES AND PROCESS FOR MAKING
Francis L. Scott, Elkins Park, Pa., and Herbert Q. Smith, Trenton, N.J., assignors to Pennsalt Chemicals Corporation, Philadelphia, Pa., a corporation of Pennsylvania
No Drawing. Filed Mar. 1, 1960, Ser. No. 11,998
4 Claims. (Cl. 260—249.8)

This invention relates to a novel process for the preparation of diureidotriazines and to novel diureidotriazines produced thereby. In particular, this invention deals with diureides of the structure:

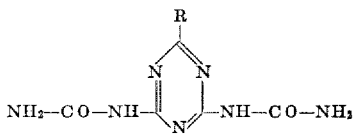

where R is a radical selected from the group of hydrogen, amino, hydroxy, alkyl, and aryl radicals.

Ureides of the above structure are of value as intermediates to synthetic plastics and coating resins which are prepared by condensation of the ureides with aldehydes (see, for example, U.S. Patent 2,312,688). Ureides have been prepared heretofore by reaction between a halogenated 1,3,5-triazine and an alkali metal derivative of urea as disclosed in U.S. Patent No. 2,394,042. In another prior art process, monoureides are formed by reaction of potassium cyanate with a monohydrochloride of an amino-1,3,5-triazine (e.g., melamine hydrochloride). Both of these processes require an intermediate step; i.e., either preparation of an alkali metal ureide for reaction with a halotriazine or preparation of an amino-triazine hydrochloride for reaction with KCNO.

It has now been found that diureides are obtained in very pure form and in good yield in a one-step process which comprises reacting a polyamino-1,3,5-triazine with a nitrogen compound selected from the group of urea and biuret by heating the reactants at a temperature between about 140° and about 250° C.

The process of this invention is carried out very easily and without special equipment. In one embodiment the polyaminotriazine compound (by which is meant a 1,3,5-triazine containing at least two amino groups) and the urea or biuret are simply mixed and heated at about 140° to about 250° C. The reaction is judged complete when the evolution of ammonia ceases. In this dry fusion or pyrolysis type reaction, it is not required that the reaction mass be molten, but no disadvantage results if it is. After the reaction is completed, the reaction mass is extracted with cold water to remove any unreacted urea and it is then extracted further with a solvent to remove any unreacted triazine starting material. The solvent selected will be one in which the starting triazine is soluble; for example, hot water for melamine and hot dioxane for benzoguanamine. The residual product is the diureidotriazine which is usually analytically pure.

It has also been observed in carrying out this technique with certain reactant combinations where yields or conversions are somewhat low, that yields and conversions are improved by heating the crude product formed with a second charge of urea or biuret. For example, with benzoguanamine and urea this repeating step tripled the conversion to 2-phenyl-4,6-diureidotriazine.

In a second embodiment of this process, the urea and triazine are heated in a liquid medium. The liquid medium, is preferably an N-substituted lower acyl amide, but other liquid solvents for urea or biuret which are stable at the reaction temperature and inert toward the reactants and product may also be used. Such liquids will be the aliphatic and aromatic hydrocarbons (such as hexane, petroleum ether, benzene, toluene, xylene, etc.) and aliphatic and alicyclic ethers, e.g., dialkyl ethers (methyl ethyl ether) dioxane and furan. Of the preferred N-substituted acyl amide solvents, dimethylformamide is preferred, but others such as dimethylacetamide and dibutylformamide may also be used. In using a liquid medium to carry out the reaction, the diureidotriazine product usually separates out as it is formed, but if necessary the solvent may be concentrated to precipitate it. The product is filtered off and extracted as described above. The temperature at which the process is carried out may vary from about 140° C. to 250° C. and, if required due to solvent selection, pressures above atmospheric may be used. Below about 140° C., the reaction does not proceed at a very practical rate, but product is obtained slowly. Above about 250° C. the organic compounds begin to be decomposed.

It is quite surprising that in carrying out this process no special care need be taken with regard to the amounts of reagents selected. It would be expected in the case of a diaminotriazine that one mole of the diaminotriazine would react with one mole of urea to give a monoureide and that with two or more moles of urea a diureide would be obtained. It is found, however, that regardless of the mole ratio of diaminotriazine to the urea or biuret, a diureide is obtained. That this process yields a diureide is further surprising in view of the fact that when thiourea is substituted for urea, either no ureide is obtained (pyrolysis reaction) or only a small amount of a monoureide is obtained (solvent system).

As indicated by the above structure, many diureides may be made by this process and the R radical of the triazine may be selected from any one of the group of hydrogen, amino, hydroxyl, alkyl and aryl radicals. It will be recognized that when R is hydrogen the triazine is guanamine. When R is amino the triazine is melamine. It is also very unexpected that melamine (which has a third reactive group) and urea react to give a diureide and that no mono- or triureide is formed regardless of the mole ratios of reactants used. It will be further recognized that where R is hydroxyl the starting triazine is ammeline. Where R is alkyl or aryl, the material reacted with urea or biuret is a substituted guanamine and is obtained readily according to known methods. Thus, to obtain 1,2-diamino - 6 - phenyl-1,3,5-triazine (benzoguanamine), the benzoic acid salt of guanidine is heated. A large number of substituted guanamines useful in this process has been prepared in this manner (see, for example, Haaf, J. pract. Chem. [2], 43, 75 (1890)). It is preferred that the R radical will be lower alkyl (e.g., methyl, ethyl, propyl, butyl) and aryl of six to ten carbon atoms (e.g., phenyl and naphthyl).

The diureides of 1,3,5-triazines of the above structure where R is hydrogen, hydroxyl, alkyl or aryl are novel compounds not known heretofore and these compounds are also of value as intermediates for plastic and coating resins. The following examples will further illustrate the invention:

EXAMPLE I

*Reaction of Melamine and Urea (Stoichiometric Amounts)*

A mixture of 21.0 g. (0.166 mole) of melamine and 20.0 g. (0.332 mole) of urea was heated at 140° C. to 198° C. for one hour. The mixture frothed somewhat as ammonia was evolved and a white deposit formed on the apparatus beyond the reaction flask. No more gas was evolved even on further heating to 220° C. The estimated conversion based on ammonia evolution was 59.6%. The residue was boiled with three 200 ml. portions of water and filtered hot. The insoluble product was 2-amino-4,6-diureidotriazine, weight 21.7 g. (61.6% conversion). The product has no melting point to 500° and was insoluble in water and organic solvents. Based on melamine recovered from the hot water treatment, the yield was 81%, and, if allowance is made for the solubility of melamine in the water at room temperature, the yield is 99%. Calculated for: $C_5H_8N_8O_2$: C, 28.4; H, 3.8; N, 52.8. Found: C, 28.61; H, 3.70; N, 52.73. Infrared spectrum was consistent with the proposed structure.

EXAMPLE II

*Reaction of Melamine and Urea (Equimolar Amounts)*

A mixture of 21.0 g. (0.166 mole) of melamine and 10.0 g. (0.166 mole) of urea was heated for 40 minutes at 145° to 200° C. The mixture remained solid. The residue was extracted exhaustively with boiling water, leaving 9.4 g. (53.5% conversion) of 2-amino-4,6-diureidotriazine, identical to that obtained in Example I.

EXAMPLE III

*Reaction of Benzoguanamine and Urea*

A mixture of 9.4 g. (0.05 mole) of benzoguanamine and 6.0 g. (0.10 mole) of urea was heated at 140–210° for 80 minutes. A white deposit formed on the apparatus beyond the reaction flask. Ammonia evolution amounted to 0.011 mole. The residue was treated with water to remove unreacted urea, leaving 11.4 g. of white solid which contained some yellow particles. This material was a mixture of unreacted benzoguanamine, a pyrolysis product of urea (perhaps of the ammelide type), and 2-phenyl-4,6-diureidotriazine product. Separation was effected as follows:

Extraction with three 50 ml. portions of hot dioxane removed the unreacted benzoguanamine. The dioxane-insoluble material was then extracted with two separate portions of hot dioxane, each of which, on cooling, deposited 0.5 g. of the diureidotriazine product; M.P. 335–336° dec. and 338–340° dec., respectively. *Analysis.*—Calcd. for $C_{11}H_{11}N_7O_2$: C, 48.4; H, 4.04; N, 36.0. Found: C, 47.84; H, 4.28; N, 35.83. Conversion to 6-phenyl-2,4-diureido-1,3,5-triazine was 11% and yield was 16% based on the amount of benzoguanamine reacted.

EXAMPLE IV

*Reaction of Benzoguanamine and Urea With Second Heating Step*

Example III was repeated heating at 150° to 245° for one and one-quarter hours. The residue was treated with water and the insoluble material was dried (12.0 g.) and heated again with another 6.0 g. of urea at 167° to 244° for 4.5 hours. The residue was treated with water, leaving 11.5 g. of insolubles. Workup of this product essentially as described in Example III gave a 35% conversion of 2-phenyl-4,6-diureidotriazine, identical to the product obtained in Example III.

EXAMPLE V

*Reaction of Melamine and Urea in Solvent System (Equimolar)*

A mixture of 10 g. (0.17 mole) of urea, 21 g. (0.17 mole) of melamine, and 130 ml. of dimethylformamide was refluxed (156°) with stirring for six hours. The mixture was cooled, the solid was filtered off, washed with cold water and dried (23 g.). It was treated three times with 200 ml. portions of boiling water and the insoluble material consisting of 16.2 g. was identical to the 2-amino-4,6-diureidotriazine described in Example I. Additional product (0.95 g.) was obtained by concentration of the dimethylformamide filtrate. Conversion was 97.4%, based on urea.

EXAMPLE VI

*Reaction of Melamine and Urea in Solvent System (Stoichiometric)*

A mixture of 10 g. (0.17 mole) of urea, 10.5 g. (0.083 mole) of melamine, and 130 ml. of dimethylformamide was refluxed for six hours after which time 63.5% of the theoretical amount of ammonia had been evolved. The mixture was cooled to room temperature and the solid was filtered off and washed with water, giving 13.2 g. (75% conversion) of 2-amino-4,6-diureidotriazine, identical to the product obtained in Example I.

EXAMPLE VII

*Reaction of Benzoguanamine and Urea in Solvent System*

A mixture of 10 g. (0.17 mole) of urea, 15.5 g. (0.083 mole) of benzoguanamine, and 130 ml. of dimethylformamide was refluxed with stirring for six hours. The reaction became homogeneous when warm and then some precipitate formed. After cooling, a small amount (0.4 g.) of insoluble material was filtered off. The dimethylformamide was concentrated under vacuum to about half its volume, cooled, and 7.1 g. of 2-phenyl-4,6-diureidotriazine was obtained, identical to the product obtained in Examples III and IV. Further concentration of the filtrate to about one-third of its volume gave an additional 5.5 g. of product; total conversion was 60%.

EXAMPLE VIII

*Reaction of Ammeline and Urea*

A mixture of 12.7 g. (0.1 mole) of ammeline, 12.0 g. (0.2 mole) of urea, and 130 ml. of dimethylformamide was refluxed for 6.5 hours. After cooling, 13.8 g. of white solid was obtained. This solid was boiled three times with 250 ml. of water and filtered hot. The insoluble material was 11.8 g. of recovered unreacted ammeline. The aqueous filtrate on cooling gave 0.7 g. of white solid, M.P. 500° C., insoluble in common organic solvents (ethanol, acetone, benzene, and dimethylformamide). This material was identified as 2-hydroxy-4,6-diureidotriazine; yield 47% (based on ammeline converted).

*Analysis.*—Calculated for $C_5H_7N_7O_3$: C, 28.2; H, 3.32; N, 46.1. Found: C, 27.83; H, 3.71; N, 46.81.

EXAMPLE IX

*Reaction of Melamine and Biuret*

A mixture of 12.6 g. (0.1 mole) of melamine, 10.3 g. (0.1 mole) of biuret, and 130 ml. of dimethylformamide was refluxed for 6.5 hours. After cooling there was obtained 17.3 g. of a solid which was treated with three 250 ml. portions of boiling water. The insoluble material, 15.6 g., was identical to the 2-amino-4,6-diureidotriazine described in Example I. An additional 1.2 g. was obtained from the aqueous filtrate; total conversion 79.1%.

EXAMPLE X

*Reaction of Benzoguanamine and Biuret*

A mixture of 18.7 g. (0.1 mole) of benzoguanamine, 10.3 g. (0.1 mole) of biuret, and 130 ml. of dimethylformamide was refluxed for 6.5 hours. On cooling there was deposited 1.8 g. of cyanuric acid. Concentration of the filtrate gave 7.3 g. of 2-phenyl-4,6-diureidotriazine, identical to the product obtained in Example III. Further concentration of the filtrate gave a mixture of 2-phenyl-4,6-diureidotriazine and benzoguanamine which was separated by treatment with dioxane (which dissolves only the benzoguanamine). A total of 10.4 g. (38.1% conversion) of product was obtained.

EXAMPLE XI

*Reaction of Acetoguanamine and Urea in Solvent System*

A mixture of 10 g. (0.17 mole) of urea, 10.4 g. (0.083 mole) of acetoguanamine, and 130 ml. of dimethylformamide was refluxed with stirring for six hours. The homogeneous solution was concentrated under vacuum and 2-methyl-4,6-diureidotriazine was deposited as a white solid.

EXAMPLE XII

*Reaction of 2-Amino-4,6-Diureidotriazine With Formaldehyde*

A mixture of 2.1 g. (10 mmol) of 2-amino-4,6-diureidotriazine, 3.7 g. (40 mmol) of 37% formaldehyde, 0.6 ml. of 0.52 N sodium hydroxide, and 0.1 g. of aqueous ammonia (29%) was refluxed for one hour. The resulting product was 2.5 g. of white solid, M.P. 310–316° dec., insoluble in water and organic solvents. A sample on the Carver press at 210° and 10,000 p.s.i. for two minutes gave a shiny, white plaque, showing the moldable nature of the polymer.

It will be apparent to those skilled in the art that many variations may be made without departing from the spirit and scope of this invention and accordingly this invention is not to be limited to the description and examples set out above.

We claim:

1. 6-hydroxy-2,4-diureido-1,3,5-triazine.
2. The process of heating at a temperature between about 140° and 250° C. a solid mixture of a polyamino-1,3,5-triazine containing at least two primary amino groups attached to carbon atoms in the triazine ring and a nitrogen compound taken from the group of urea and biuret, extracting the reaction product with water, adding additional nitrogen compound to the water-insoluble residue and further heating the mixture at 140° to 250° C. whereby an increased yield of a diureidotriazine product is formed.
3. The process of claim 2 wherein the nitrogen compound is urea.
4. The process of claim 2 wherein the nitrogen compound is urea and the triazine is benzoguanamine.

References Cited in the file of this patent

UNITED STATES PATENTS

| | | |
|---|---|---|
| 2,394,042 | D'Alelio | Feb. 5, 1946 |
| 2,611,782 | Bortnick | Sept. 23, 1952 |

FOREIGN PATENTS

| | | |
|---|---|---|
| 639,218 | Great Britain | June 21, 1950 |
| 56,824 | France | Oct. 7, 1952 |
| 930,681 | France | Feb. 2, 1948 |

OTHER REFERENCES

Chemical Abstracts I, volume 22, column 1139 (1928).

Hackh's Chemical Dictionary, 2d edition, P. Blakiston's Son and Company, Inc., page 21 (1937).

Chemical Abstracts II, volume 44, column 9443 (1950).

Austerweil, Chemistry and Industry, 1952, pages 372 to 375.

Smolin et al.: "S-Triazines and Derivatives," pages 236, 347 and 359, Interscience Publishers, Inc. (February 1959).

UNITED STATES PATENT OFFICE
CERTIFICATE OF CORRECTION

Patent No. 3,101,335            August 20, 1963

Francis L. Scott et al.

It is hereby certified that error appears in the above numbered patent requiring correction and that the said Letters Patent should read as corrected below.

Column 3, line 57, for "conversion of" read -- conversion to --.

Signed and sealed this 25th day of February 1964.

(SEAL)
Attest:
ERNEST W. SWIDER

Attesting Officer

EDWIN L. REYNOLDS
Acting Commissioner of Patents